United States Patent
Grigsby et al.

(10) Patent No.: US 9,327,178 B2
(45) Date of Patent: *May 3, 2016

(54) MODIFICATION OF TURF TV PARTICIPANT DECORATIONS BASED ON MULTIPLE REAL-TIME FACTORS

(75) Inventors: Travis M. Grigsby, Austin, TX (US); Steven M. Miller, Cary, NC (US); Lisa A. Seacat, San Francisco, CA (US)

(73) Assignee: International Business Machines Corporation, Armonk, NY (US)

(*) Notice: Subject to any disclaimer, the term of this patent is extended or adjusted under 35 U.S.C. 154(b) by 1001 days.

This patent is subject to a terminal disclaimer.

(21) Appl. No.: 13/490,584

(22) Filed: Jun. 7, 2012

(65) Prior Publication Data

US 2012/0242699 A1    Sep. 27, 2012

Related U.S. Application Data

(63) Continuation of application No. 11/952,681, filed on Dec. 7, 2007, now Pat. No. 8,269,835.

(51) Int. Cl.
*H04N 7/18* (2006.01)
*A63B 71/06* (2006.01)
(Continued)

(52) U.S. Cl.
CPC ......... *A63B 71/0619* (2013.01); *A63B 24/0021* (2013.01); *H04N 21/2187* (2013.01); *A63B 2024/004* (2013.01); *A63B 2024/0025* (2013.01); *A63B 2024/0028* (2013.01); *A63B 2024/0056* (2013.01); *A63B 2071/0658* (2013.01); *A63B 2207/02* (2013.01); *A63B 2220/12* (2013.01); *A63B 2220/20* (2013.01); *A63B 2220/30* (2013.01); *A63B 2220/35* (2013.01);
(Continued)

(58) Field of Classification Search
CPC ........... A63B 71/0619; A63B 24/0021; A63B 2024/0056; A63B 2220/76; A63B 2220/12; A63B 2220/806; A63B 2220/833; A63B 2220/89; A63B 2024/0025; A63B 2220/836; A63B 2207/02; A63B 2225/54; A63B 2220/20; A63B 2243/007; A63B 2071/0658; A63B 2220/35; A63B 2024/0028; A63B 2220/70; A63B 2243/0037; A63B 2220/808; A63B 2243/0025; A63B 2024/004; A63B 2220/30; H04N 21/2187; A63F 2300/6692; A63F 2300/69; H04Q 2213/13095
USPC ................ 348/157; 340/572.1, 573.1, 815.4; 345/419; 463/30
See application file for complete search history.

(56) References Cited

U.S. PATENT DOCUMENTS 6,532,007 B1 * 3/2003 Matsuda ........................ 345/419
6,710,713 B1 * 3/2004 Russo .......................... 340/573.1
(Continued)

*Primary Examiner* — Allen C Wong
(74) *Attorney, Agent, or Firm* — Winstead, P.C.

(57) ABSTRACT

A method, system and compute program product for modifying sporting event participant decorations displayed on a fiber optic "Turf TV" playing surface. A utility calculates a direction of movement of a player or object in proximity to the playing surface, which is configured to display images, during a live sporting event. The utility adds a graphical aura to a real-time graphical image displayed in proximity to the player on the playing surface. The utility animates the aura in response to wind and/or noise in proximity to the playing surface. The utility modifies the aura based on pre-defined custom attributes, penalties, errors, and/or player status. If the player moves, the utility adds a graphical player trail to the image. The utility also adds a graphical object trail that includes previous locations of an object. The object trail may also include spin and a visual appearance corresponding to an object height.

16 Claims, 4 Drawing Sheets

(51) Int. Cl.
*A63B 24/00* (2006.01)
*H04N 21/2187* (2011.01)

(52) U.S. Cl.
CPC ......... *A63B2220/70* (2013.01); *A63B 2220/76* (2013.01); *A63B 2220/806* (2013.01); *A63B 2220/808* (2013.01); *A63B 2220/833* (2013.01); *A63B 2220/836* (2013.01); *A63B 2220/89* (2013.01); *A63B 2225/54* (2013.01); *A63B 2243/007* (2013.01); *A63B 2243/0025* (2013.01); *A63B 2243/0037* (2013.01); *A63F 2300/6692* (2013.01); *A63F 2300/69* (2013.01); *H04Q 2213/13095* (2013.01)

(56) References Cited

U.S. PATENT DOCUMENTS

| | | | |
|---|---|---|---|
| 6,950,123 B2 * | 9/2005 | Martins | 348/157 |
| 6,982,649 B2 * | 1/2006 | Blum et al. | 340/815.4 |
| 7,905,779 B2 * | 3/2011 | Dyke et al. | 463/30 |
| 2002/0126013 A1 * | 9/2002 | Bridgelall | 340/572.1 |

* cited by examiner

MODIFICATION OF TURF TV PARTICIPANT DECORATIONS BASED ON MULTIPLE REAL-TIME FACTORS

CROSS-REFERENCE TO RELATED APPLICATIONS

The present application is a continuation application of pending U.S. patent application Ser. No. 11/952,681, which was filed on Dec. 7, 2007, which is assigned to the assignee of the present invention. The present application claims priority benefits to U.S. patent application Ser. No. 11/952,681.

BACKGROUND

The present invention relates in general to display systems and in particular to fiber optic display systems included in a playing surface of a sporting event.

Real life sporting events typically include numerous players and officials interacting according to the rules of a game. It can be difficult for viewers to identify particular players and/or to discern which players are currently interacting. A viewer who is unfamiliar with a game may lose interest if the viewer is unable to identify particular players and/or follow the action on the field. Furthermore, games (e.g., football) may include many rules that may not be immediately apparent to a viewer who is unfamiliar with all of the rules of the game.

SUMMARY

Disclosed are a method, system, and computer program product for modifying sporting event participant decorations displayed on a fiber optic "Turf TV" playing surface based on multiple real-time factors. A data processing system includes a decoration utility which detects a tag or signal transmitting device attached to a player or object in proximity to a playing surface during a live sporting event. The decoration utility calculates a direction of movement of the player or object in proximity to a playing surface during a live sporting event. The playing surface includes multiple optical fibers configured to display one or more images. The decoration utility adds a generally circular graphical aura to a real-time image displayed on the playing surface in proximity to the player during the sporting event. The decoration utility animates the aura in response to wind and/or noise in proximity to the playing surface. The decoration utility modifies the aura to correspond to pre-defined custom attributes, penalties, errors, and/or the status of the player. If the player moves, the decoration utility adds a graphical player trail to the image displayed on the playing surface during the sporting event. The decoration utility also adds a graphical object trail to the image displayed on the playing surface during the sporting event that includes previous locations of an object. The object trail may also include spin and a visual appearance configurable in relation to a height of the object.

The above as well as additional features of the present invention will become apparent in the following detailed written description.

BRIEF DESCRIPTION OF THE SEVERAL VIEWS OF THE DRAWINGS

The invention itself will best be understood by reference to the following detailed description of an illustrative embodiment when read in conjunction with the accompanying drawings, wherein.

DETAILED DESCRIPTION

The present invention provides a method, system, and computer program product for modifying live sporting event participant decorations displayed on a fiber optic "Turf TV" playing surface based on multiple real-time factors. As utilized herein, "Turf TV" refers to a playing surface (e.g., a football field) that includes multiple optical fibers blended with artificial (e.g., polyethylene) grass. A data processing system, such as data processing system 100, connected to a Turf TV field may display one or more colored images on the Turf TV field using the optical fibers.

Figure 1:
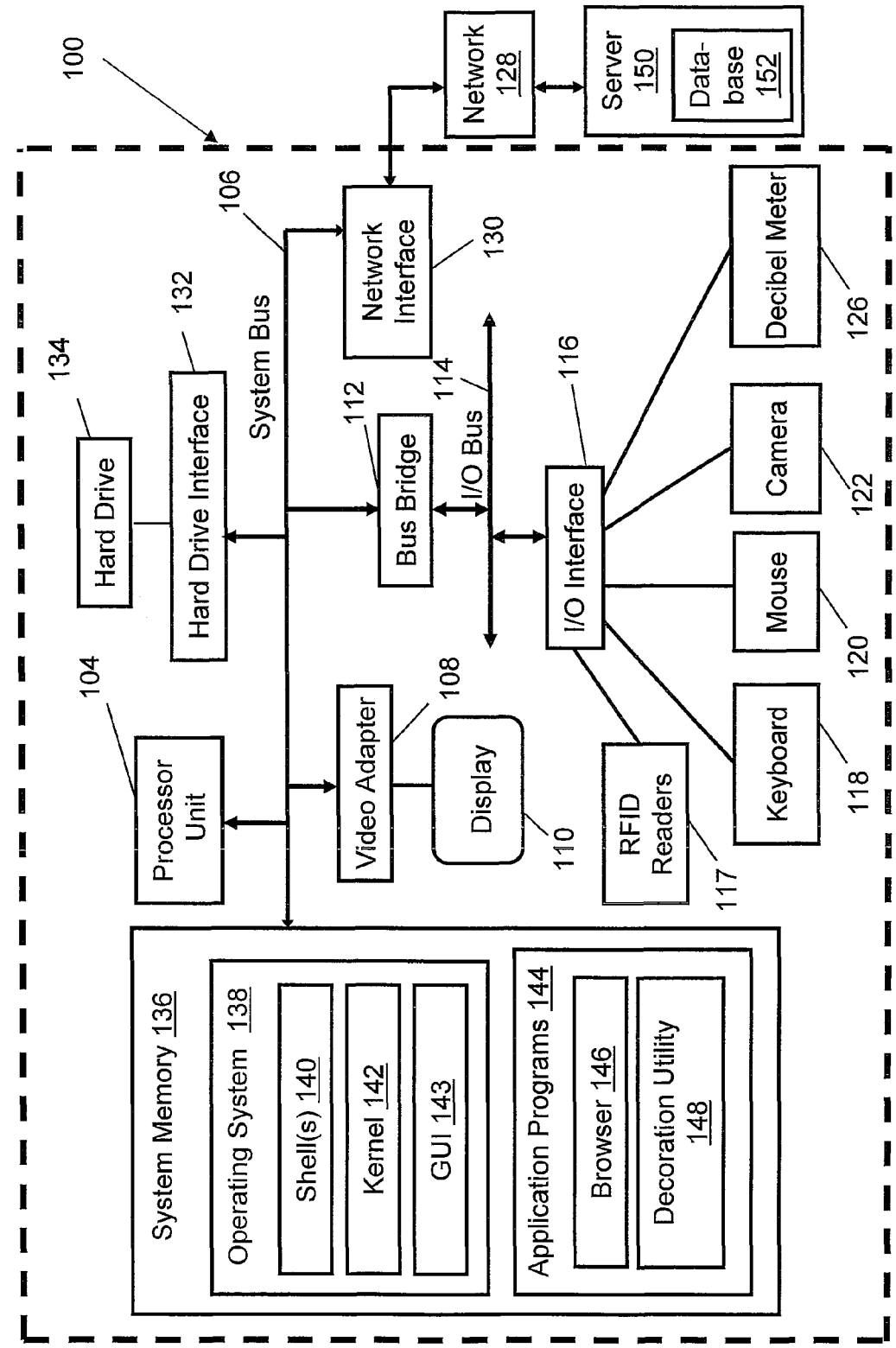
FIG. 1 depicts a high level block diagram of an exemplary data processing system, according to an embodiment of the present invention.
Figure 2A:
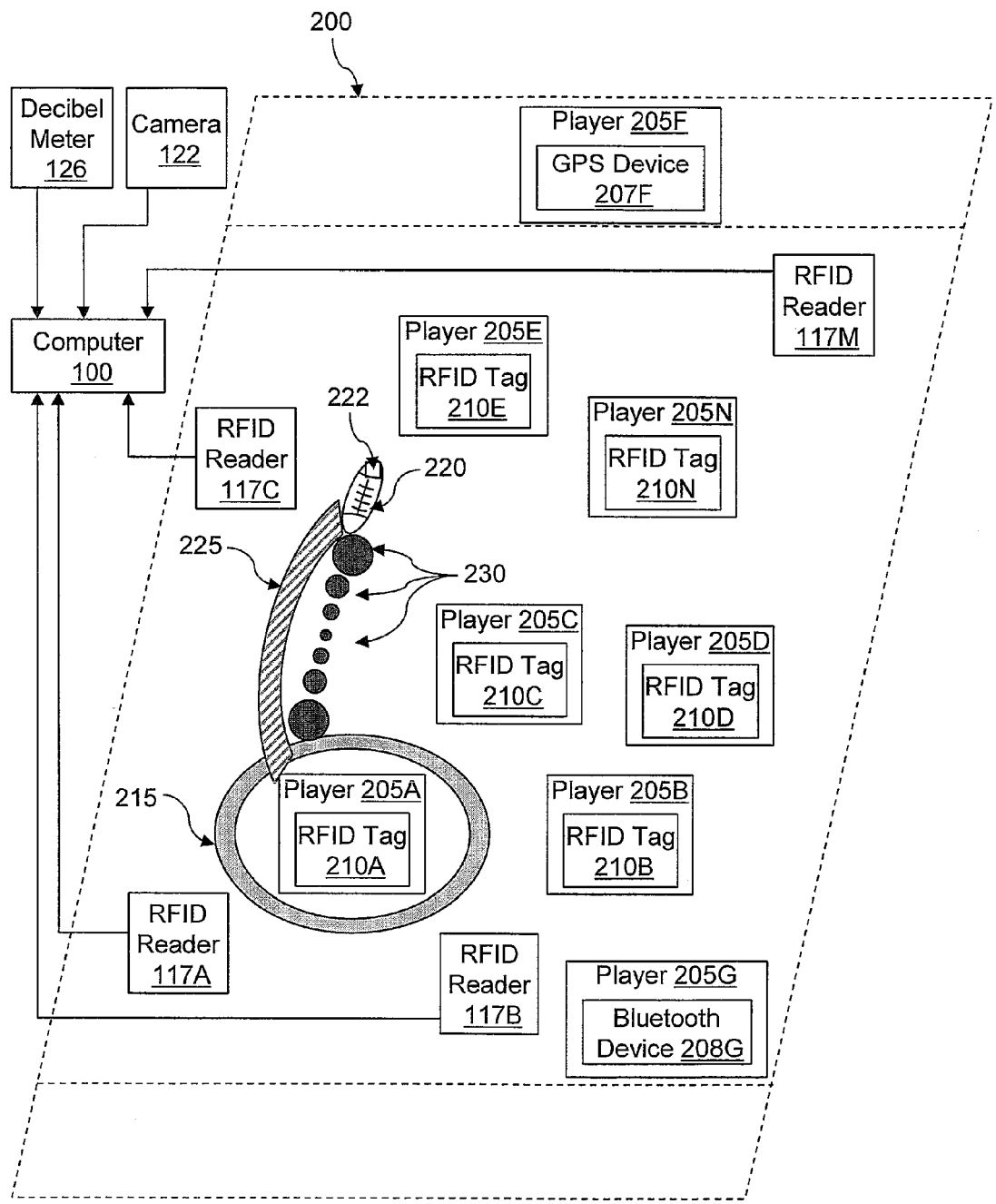
FIG. 2A illustrates a first view of a live sporting event, according to an embodiment of the present invention.
Figure 2B:
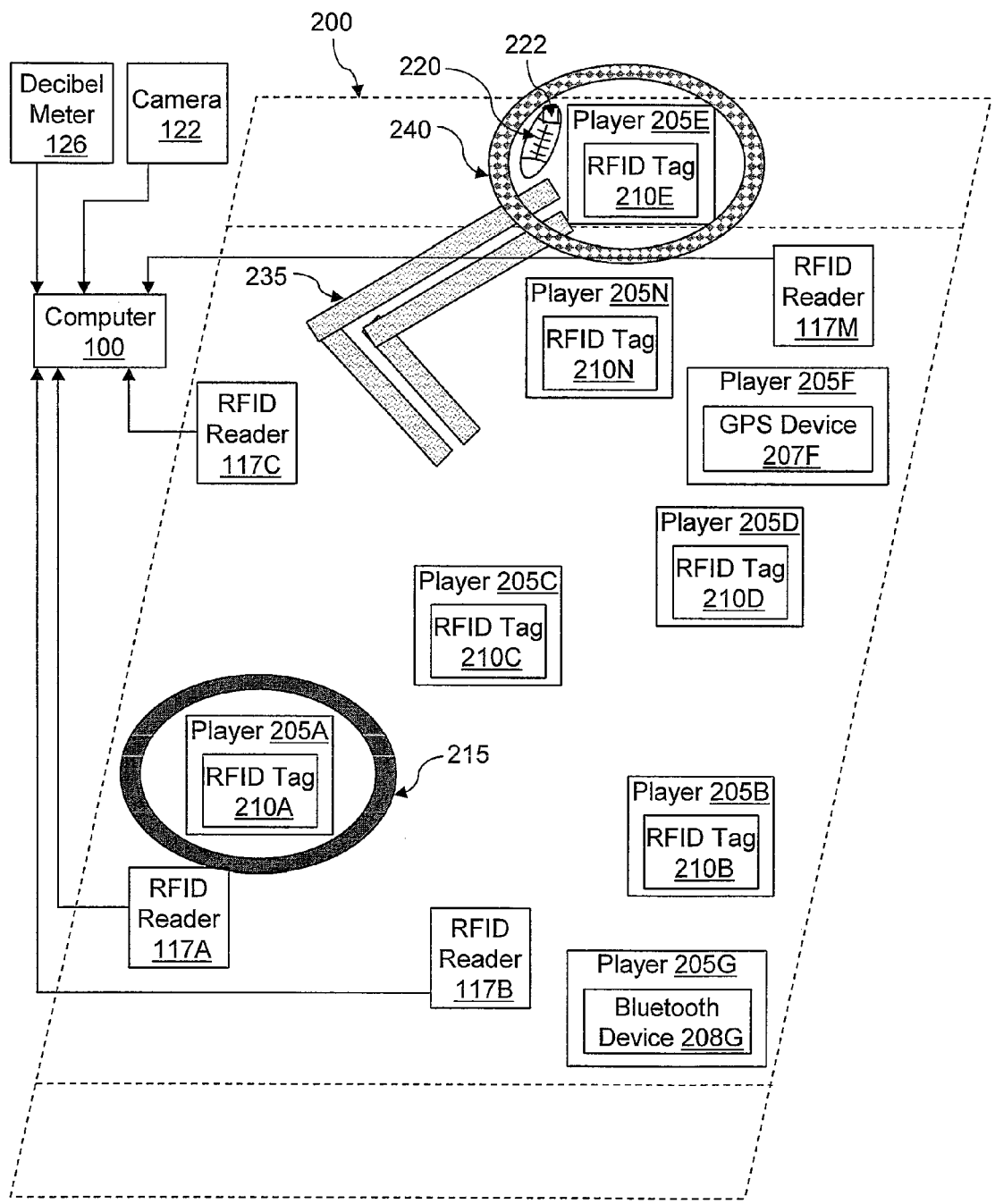
FIG. 2B illustrates a second view of the live sporting event of FIG. 2A, according to an embodiment of the present invention.

With reference now to FIG. 1, there is depicted a block diagram of an exemplary data processing system 100, with which the present invention may be utilized. Data processing system 100 includes processor unit 104 that is coupled to system bus 106. Video adapter 108, which drives/supports display 110, is also coupled to system bus 106. System bus 106 is coupled via bus bridge 112 to Input/Output (I/O) bus 114. I/O interface 116 is coupled to I/O bus 114. I/O interface 116 affords communication with various I/O devices, including one or more Radio Frequency Identification (RFID) readers 117, keyboard 118, mouse 120, camera 122, and decibel meter 126. The format of the ports connected to I/O interface 116 may be any known to those skilled in the art of computer architecture, including but not limited to Universal Serial Bus (USB) ports. RFID readers 117 may detect one or more RFID tags attached to one or more players (e.g., in a shoe or helmet), and/or objects (e.g., in a ball or hockey puck) in proximity to a playing surface. RFID readers 117 may be positioned in proximity to a playing surface (e.g., beneath the grass of a "Turf TV" football field), as illustrated in FIGS. 2A-2B, which are described below. Camera 122 may be a digital camera, high definition camera, or the like. In one embodiment, multiple cameras may be connected to data processing system 100.

Data processing system 100 is able to communicate with server 150 via network 128 using network interface 130, which is coupled to system bus 106. Network 128 may be an external network such as the Internet, or an internal network such as a Local Area Network (LAN), an Ethernet, or a Virtual Private Network (VPN). In one embodiment, server 150 is configured similarly to data processing system 100. Server 150 may include database 152, which includes real-time game statistics data and/or pre-defined player decoration attributes. Database 152 is accessible to data processing system 100 via network 128. In another embodiment, real-time game statistics data may be included in system memory 136 or other local storage of data processing system 100.

Hard drive interface 132 is also coupled to system bus 106. Hard drive interface 132 interfaces with hard drive 134. In one embodiment, hard drive 134 populates system memory 136, which is also coupled to system bus 106. System memory 136 is defined as a lowest level of volatile memory in data processing system 100. This volatile memory may include additional higher levels of volatile memory (not shown), including, but not limited to, cache memory, registers, and buffers. Data that populates system memory 136 includes Operating System (OS) 138 and application programs 144.

OS 138 includes shell 140, for providing transparent user access to resources such as application programs 144. Generally, shell 140 (as it is called in UNIX®) is a program that provides an interpreter and an interface between the user and the operating system. Shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes graphical user interface (GUI) 143 and kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include browser 146 and decoration utility 148. Browser 146 includes program modules and instructions enabling a World Wide Web (WWW) client (i.e., data processing system 100) to send and receive network messages to the Internet. Data processing system 100 may utilize HyperText Transfer Protocol (HTTP) messaging to enable communication with server 150. According to the illustrative embodiment, decoration utility 148 performs the functions illustrated in FIG. 3, which is described below. In an alternate embodiment, decoration utility 148 may be stored in an external location, such as server 150.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIGS. 1 and 2xx for FIG. 2). The specific numerals assigned to the elements are provided solely to aid in the description and not meant to imply any limitations (structural or functional) on the invention.

With reference now to FIG. 2A, there is depicted a first view of a live sporting event displayed on a fiber optic Turf TV playing surface, according to an embodiment of the present invention. As shown, the sporting event occurs on and/or in proximity to playing surface 200. As utilized herein, playing surface 200 may refer to a football field, soccer field, ice hockey rink, basketball court, baseball diamond, rugby pitch, lacrosse field, bowling alley, Olympic stadium, or the like which includes a fiber optic Turf TV display system. Multiple RFID readers 117A through 117M (FIG. 1) are placed in different locations in proximity to playing surface 200. For example, RFID readers 117A-117M may be beneath the turf of a football field, soccer field, or rugby pitch. Similarly, RFID readers 117A-117M may be attached to one or more fixtures in proximity to playing surface 200 (e.g., goal posts, basketball backboards, scoreboards, and/or sideline markers).

According to the illustrative embodiment, RFID readers 117A-117M are connected to data processing system 100 (FIG. 1), which is located in proximity to playing surface 200 (e.g., by cables beneath playing surface 200). In another embodiment, RFID readers 117A-117M may communicate with data processing system 100 wirelessly (e.g., via network 128 of FIG. 1). As shown, decibel meter 126 and camera 122 (FIG. 1) are also connected to data processing system 100 and located in proximity to playing surface 200. Camera 122 may detect the location of one or more players and/or objects in relation to playing surface 200. Decibel meter 126 may measure a sound level (e.g., crowd noise) on or near playing surface 200 or near a player/object.

In one embodiment, multiple players 205A through 205N are playing a game with object 220. As utilized herein, object 220 may refer to a football, soccer ball, rugby ball, ice hockey puck, basketball, baseball, lacrosse ball, bowling ball, relay baton, or the like. Different types of signal transmitting devices may be attached to a players 205A-205N and/or object 220. The signal transmitting devices may include RRID tags, radio frequency (RF) transmitters (e.g., Bluetooth® transmitters), Global Positioning System (GPS) devices (e.g., transceivers), and other wireless devices. For example, RFID tags 210A through 210N are attached to equipment (including clothing) worn by players 205A-205N, respectively. For example, RFID tags 210A-210N may be included in shoes, jerseys, pants, pads, helmets, or other gear worn by players 205A-205N during a live sporting event. Similarly, object 220 includes RFID tag 222 (e.g., inside a ball). One or more of RFID readers 117A-117M may detect one or more of RFID tags 210A-210N and/or RFID tag 222 using RF energy, thereby enabling decoration utility 148 (FIG. 1) in data processing system 100 to calculate the positions, speeds, and/or directions of movement of players 205A-205N (e.g., via triangulation) and/or object 222 with respect to playing surface 200.

In another embodiment, decoration utility 148 may use camera 122 in addition to RFID readers 117A-117M or instead of RFID readers 117A-117M to calculate the positions, speeds, and/or directions of movement of players 205A-205N and/or object 222 (e.g., using orthogonal views and image recognition software). In one embodiment, decoration utility 148 may identify one or more players by detecting signals from GPS devices attached to equipment (including clothing) worn by players 205A-205N. For example, GPS device 207F may be attached to equipment worn by player 205F. Similarly, decoration utility 148 may identify one or more players by detecting signals transmitted from RF transmitters, such as Bluetooth® transmitters, attached to equipment (including clothing) worn by players 205A-205N. For example, Bluetooth® device 208G may be attached to equipment worn by player 205G.

Figure 3:
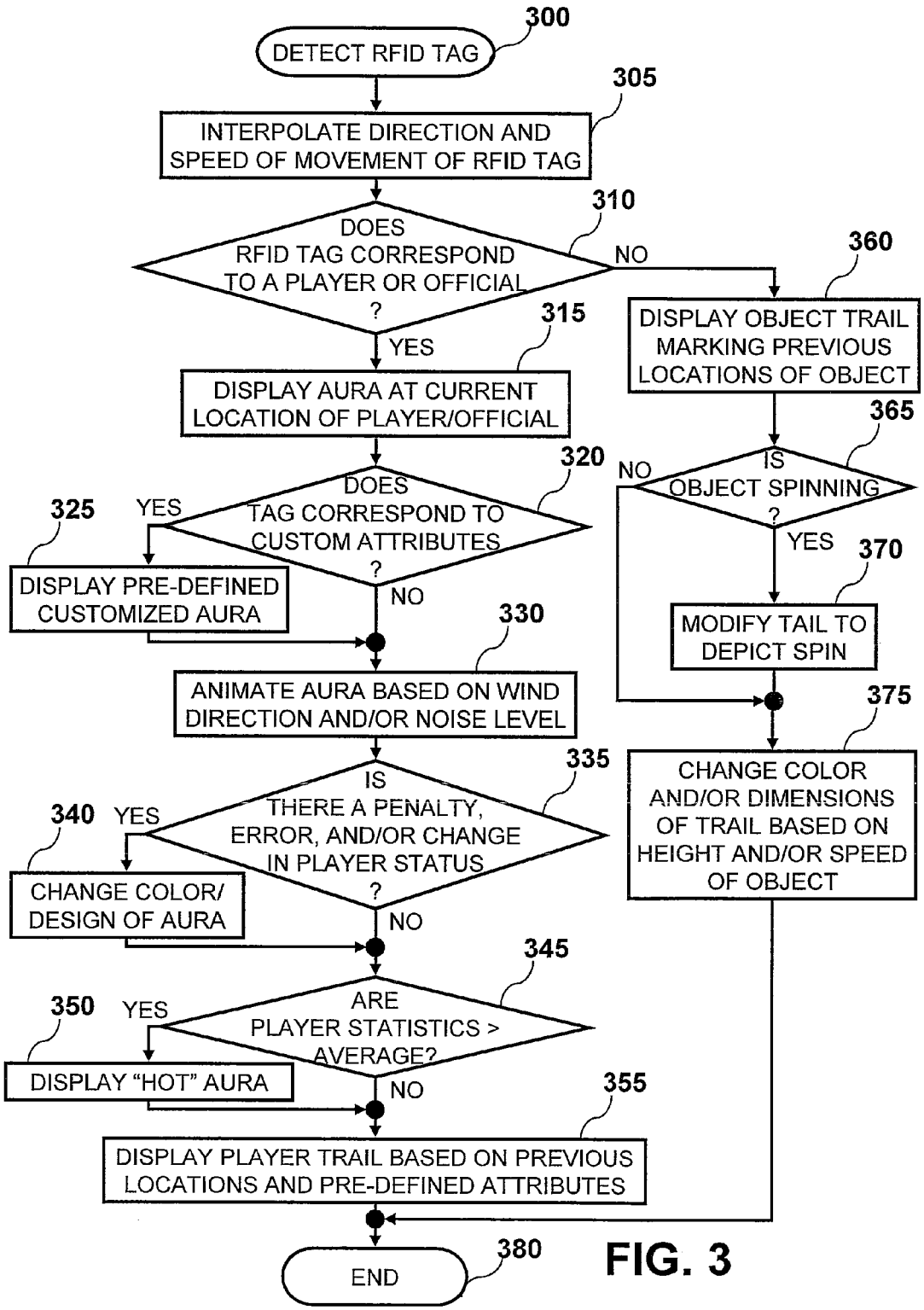
FIG. 3 is a high level logical flowchart of an exemplary method of modifying sporting event participant decorations displayed on a fiber optic "Turf TV" playing surface based on multiple real-time factors.

According to the illustrative embodiment, real-time images displayed on playing surface 200 during a live sporting event may include one or more auras, such as aura 215, and/or one or more trails, such as object trail 225. As utilized herein, an aura refers to a generally circular graphical colored design that is added to a real-time (i.e., "live") graphical image displayed on playing surface 200 during a live sporting event. An aura surrounds a current location of a player equipped with a RFID tag. One or more auras corresponding to different RFID tags (i.e., different players) may be displayed on playing surface 200 during a live sporting event. An aura may include a pre-defined design stored within database 152 (FIG. 1). A pre-defined aura design may include one or more colors, letters, numbers, and/or shapes that are customized to correspond to attributes of a player (e.g., jersey numbers and/or player initials) and/or team (e.g., team colors or mascot-related symbols). An aura may also be selectively animated based on one or more current environmental factors in proximity to playing surface 200. For example, an aura may flap or ruffle in a direction corresponding to a wind blowing in proximity to playing surface 200. Decoration utility 148 may receive weather (i.e., wind) updates from a weather monitoring station and/or website connected to network 128. Similarly, an aura may shake or become fuzzy (i.e., include rough animated edges) if decibel meter 126 detects crowd noise above a pre-defined threshold level. Decoration utility 148 may also animate an aura based on rain, snow, humidity, and/or temperature in proximity to playing surface 200. A method of displaying an aura, such as aura 215, is illustrated in FIG. 3, which is described below.

As utilized herein, an object trail refers to a graphical representation of the previous locations of a moving object, such as object 220, added to an image displayed on playing surface 200 during a live sporting event. An object trail may include one or more colored lines and/or shapes, such as object trail 225. In another embodiment, an object trail may include multiple shapes having dimensions and/or colors that correspond to the height of object 220 with respect to playing surface 200, such as object trail 230. Object trail 230 includes multiple shapes in proximity to playing surface 200. The shapes included in object trail 230 have dimensions that decrease in size as the height of object 220 increases and increase in size as the height of object 220 decreases (i.e., a graphical depiction of a shadow). Object trail 225 may also be shaped and/or animated to represent the spin and/or trajectory of object 222. A method of displaying an object trail, such as object trails 225 and 230, is illustrated in FIG. 3, which is described below.

With reference now to FIG. 2B, there is depicted a second view of the live sporting event of FIG. 2A, according to an embodiment of the present invention. As shown, customized aura 240 surrounds player 205E on playing surface 200, and customized aura 240 includes multiple shapes and colors based on pre-defined attributes corresponding to RFID tag 210E (i.e., player 205E). Pre-defined attributes corresponding to one or more RFID tags (i.e., one or more players) may be stored in database 152 on server 150 (FIG. 1) and/or locally within system memory 136.

According to the illustrative embodiment, decoration utility 148 (FIG. 1) may add a player trail, such as player trail 235, to a real-time graphical image displayed on playing surface 200 during a live sporting event when a player, such as player 205E, moves while handling object 220. As utilized herein, a player trail refers to a graphical representation of the previous locations of a moving player that is displayed on playing surface 200. A player trail may include a colored line, design, and/or multiple shapes customized to correspond to one or more attributes of a particular player, team, and/or live sporting event sponsor. For example, player trail 235 may include a set of tire tracks if a particular player's nickname corresponds to a bus, truck, or car. Similarly, a player trail may include one or more "footprint" designs (e.g., animal footprints if a player's nickname corresponds to an animal). A player trail may also include one or more designs that correspond to a sponsor of a live sporting event and/or a particular player. For example, a player's trail may include company icons that correspond to a shoe manufacturer endorsed by the player and/or a television company providing a broadcast of the live sporting event.

In one embodiment, decoration utility 148 may change one or more attributes of an aura based on the action of a live sporting event and/or the rules of a game. For example, aura 215 may change from a first color (e.g., green), as shown in FIG. 2A, to a second color (e.g., red), as shown in FIG. 2B, when player 205A is no longer handling object 220 (i.e., when it is no longer legal to interact with or "hit" player 205A). Similarly, database 152 may include real-time electronic statistics data. Decoration utility 148 may change one or more attributes of a player's aura if the player's current performance statistics exceed one or more pre-defined average performance statistics (i.e., if a player is "hot"). In one embodiment, decoration utility 148 may change one or more attributes of an aura if the player corresponding to the aura commits a foul (e.g., the aura may become red or may flash). Similarly, decoration utility 148 may place a distinctly colored and/or flashing aura in proximity to an official if the official calls a foul (e.g., if a referee throws a flag and/or blows a whistle). A method of changing a player's aura is illustrated in FIG. 3, which is described below.

Turning now to FIG. 3, there is illustrated a high level logical flowchart of an exemplary method of modifying live sporting event participant decorations displayed on a fiber optic Turf TV playing surface based on multiple real-time factors, according to an embodiment of the invention. The process begins at block 300 in response to one or more of RFID readers 117A-117M (FIGS. 2A-2B) detecting one or more of RFID tags 210A-210N (FIGS. 2A-2B) and/or RFID tag 222 (FIGS. 2A-2B). Decoration utility 148 (FIG. 1) uses data from one or more of RFID readers 117A-117M to calculate the location (e.g., via triangulation) and interpolate the direction of movement and/or speed of one or more of RFID tags 210A-210N, as depicted in block 305.

At block 310, decoration utility 148 determines whether or not a detected RFID tag corresponds to a player or an official. If the detected RFID tag does not correspond to a player or official (i.e., the detected RFID tag corresponds to an object), the process proceeds to block 360. If the detected RFID tag corresponds to a player or official (i.e., a person rather than an object), decoration utility 148 adds an aura to a real-time image displayed on playing surface 200 (FIGS. 2A-2B) during a live sporting event, such as aura 215 (FIG. 2A), as shown in block 315.

At block 320, decoration utility 148 determines whether or not the detected RFID tag includes a value that identifies pre-defined customized decoration data stored in database 152 (FIG. 1). If the detected RFID tag does not include a value that identifies pre-defined customized decoration data, the process proceeds to block 330. If the detected RFID tag includes a value that identifies pre-defined customized decoration data (e.g., a personalized aura for a player), decoration utility 148 updates the real-time image displayed on playing surface 200 during the sporting event to include the pre-defined custom aura, as depicted in block 325. At block 330, decoration utility 148 may animate one or more displayed auras based on a wind direction and/or a noise level in proximity to playing surface 200. Decoration utility 148 may receive data including a wind direction from a weather monitoring website and/or device connected to network 128 or data processing system 100. Decoration utility 148 may receive data including a noise level (i.e., crowd noise) from decibel meter 126 (FIGS. 2A-2B).

At block 335, decoration utility 148 determines whether or not a penalty has occurred in the live sporting event, a player has committed an error, and/or a player's status has changed (i.e., other players may no longer interact with or "hit" the player). In one embodiment, decoration utility 148 may receive input from a wireless device carried by an official that the official triggers in response to a penalty. Decoration utility 148 may receive input from sporting event crew members (i.e., "booth" personnel) if a penalty occurs and/or if a player commits an error. Decoration utility 148 may receive data corresponding to one or more game rules from database 152 and determine if a player's status has changed based on the detected location of the player in relation to object 220 (FIGS. 2A-2B), other players, and/or playing surface 200 (e.g., if the player goes out of bounds). In another embodiment, decoration utility 148 may receive input from camera 122 (FIGS.

2A-2B) and use image recognition software to determine whether a penalty has occurred (e.g., via recognition of referee hand signals).

Returning again to FIG. 3, if a player corresponding to a detected RFID tag has not committed a penalty, has not committed an error, and/or is still eligible to interact with other players, the process proceeds to block 345. If a player corresponding to a detected RFID tag commits a penalty, commits an error, and/or is no longer eligible to interact with other players, decoration utility 148 changes one or more colors and/or designs of the aura corresponding to the player, as depicted in block 340. For example, if a player commits a penalty or error, decoration utility 148 may change the color of the player's aura to red and/or flash the aura displayed on playing surface 200.

At block 345, decoration utility 148 determines whether or not the current performance of a player corresponding to a detected RFID tag exceeds one or more pre-defined average statistical performance levels stored in database 152. If a player is not exceeding one or more pre-defined average statistical performance levels, the process proceeds to block 355. If a player exceeds one or more pre-defined average statistical performance levels stored in database 152 (e.g., if a player is catching more passes than usual), decoration utility 148 may change the shape and/or design of the aura corresponding to the player to a "hot" aura (e.g., an animated aura having a design resembling fire), as depicted in block 350.

Decoration utility 148 may display a player trail, such as player trail 235 (FIG. 2B), on playing surface 200 if a player corresponding to a detected RFID tag is moving while handling object 220, as shown in block 355, and the process subsequently terminates at block 380. Player trail 235 may include one or more pre-defined attributes (e.g., colors, designs, and/or shapes) corresponding to a particular player and/or sponsor.

At block 360, decoration utility 148 adds an object trail to the real-time image displayed on playing surface 200 during the live sporting event, such that the object trail marks the previous locations of RFID tag 222 (i.e., object 220) with respect to playing surface 200. At block 365, decoration utility determines whether or not object 220 is spinning by comparing input from multiple RFID readers and/or camera 122. If object 220 is not spinning, the process proceeds to block 375. If object 220 is spinning, decoration utility 148 may modify object trail 225 (FIG. 2A) to include a design and/or animation that depicts the spin (e.g., an animated spiral-shaped design), as shown in block 370. Decoration utility 148 may change the color and/or dimensions of object trail 225 and/or object trail 230 (FIG. 2A) to correspond to the height and/or speed of object 220, as depicted in block 375. Decoration utility 148 may calculate the height of object 220 using input from multiple RFID readers and/or camera 122, and the process terminates at block 380.

The present invention thus provides a method of modifying live sporting event participant decorations displayed on a fiber optic Turf TV playing surface based on multiple real-time factors. Data processing system 100 (FIG. 1) includes decoration utility 148 (FIG. 1) which detects a tag or signal transmitting device attached to a player or object in proximity to playing surface 200 (FIGS. 2A-2B) during a live sporting event. The decoration utility calculates a direction of movement of the player or object in proximity to playing surface 200 during the live sporting event. Decoration utility 148 adds a graphical aura to a real-time image displayed in proximity to the player on playing surface 200 during the sporting event. Decoration utility 148 animates the aura in response to wind and/or noise in proximity to playing surface 200. Decoration utility 148 modifies the aura to correspond to pre-defined custom attributes, penalties, errors, and/or the status of the player. If the player moves, decoration utility 148 adds a graphical player trail to the image displayed on playing surface 200. Decoration utility 148 also adds a graphical object trail to the image displayed on playing surface 200 that includes previous locations of object 220 (FIGS. 2A-2B). The object trail may also include spin and a visual appearance configurable in relation to a height of object 220.

In the flow chart (FIG. 3) above, one or more of the methods are embodied as a computer program product in a computer readable medium or containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture (or computer program product) in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional data processing system with installed (or executed) software, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for modifying sporting event participant decorations, the method comprising:
    identifying, by a processor, a player in proximity to a playing surface during a sporting event, wherein said playing surface includes a plurality of optical fibers configured to display one or more images;
    adding, by said processor, a graphical aura in proximity to said player to a real-time graphical image displayed on said playing surface during said sporting event;
    calculating a direction of movement of said player;
    adding a graphical player trail to said real-time graphical image displayed on said playing surface during said sporting event in response to said player moving with respect to said playing surface, wherein said graphical player trail comprises a graphical indication of at least one previous location of said player and a current location of said player; and
    modifying said aura to include one or more pre-defined custom attributes in response to a determination that said player corresponds to said one or more pre-defined custom attributes.

2. The method as recited in claim 1, wherein said identifying of said player further comprises at least one of:
    detecting a signal from a radio frequency identification (RFID) tag in proximity to said playing surface during said sporting event, wherein said RFID tag is attached to equipment used by said player;
    detecting a location of a global positioning system (GPS) transmitter in proximity to said playing surface during said sporting event, wherein said GPS transmitter is attached to equipment used by said player;
    detecting a signal from a radio frequency (RF) device in proximity to said playing surface during said sporting event, wherein said RF device is attached to equipment used by said player, and wherein said RF device comprises a Bluetooth transmitter; and
    detecting a shape of said player in a live video image of said sporting event.

3. The method as recited in claim 1, wherein said adding of said graphical aura further comprises at least one of:
    changing a visual appearance of said aura in response to said player committing a penalty;
    changing said visual appearance of said aura in response to one or more opposing players no longer being eligible to interact with said player; and
    changing said visual appearance of said aura in response to one or more real-time statistical performance levels of said player exceeding one or more pre-defined performance levels.

4. The method as recited in claim 1, wherein said adding of said graphical aura further comprises animating said graphical aura in response to a speed of wind detected in proximity to said playing surface.

5. The method as recited in claim 1, wherein said adding of said graphical aura further comprises animating said aura in response to a level of noise detected in proximity to said playing surface.

6. The method as recited in claim 1 further comprising:
    identifying an object included in said sporting event; and
    adding a graphical object trail to said real-time graphical image displayed on said playing surface during said sporting event, wherein said graphical object trail comprises a graphical indication of at least one previous location of said object and a current location of said object.

7. The method as recited in claim 6, wherein said adding of said graphical object trail further comprises at least one of:
    modifying said graphical object trail to depict a spin of the object in response to a movement of said object including said spin; and
    changing a visual appearance of said graphical object trail to correspond to a height of said object with respect to said playing surface in response to a movement of said object in a vertical direction relative to said playing surface.

8. A system, comprising:
    a processor;
    a system memory coupled to said processor;
    a playing surface having a plurality of optical fibers configured to display one or more images;
    one or more detecting devices in proximity to the playing surface, and used for detecting wireless signals and environmental conditions; and
    an application program within said system memory that provides the functions of:
        identifying a player in proximity to said playing surface during a sporting event;
        adding a graphical aura in proximity to said player to a real-time graphical image displayed on said playing surface during said sporting event;
        calculating a direction of movement of said player;
        adding a graphical player trail to said real-time graphical image displayed on said playing surface during said sporting event in response to said player moving with respect to said playing surface, wherein said graphical player trail comprises a graphical indication of at least one previous location of said player and a current location of said player; and
        modifying said aura to include one or more pre-defined custom attributes in response to a determination that said player corresponds to said one or more pre-defined custom attributes.

9. The system as recited in claim 8, wherein said one or more detecting devices comprise a camera, a noise monitor, a Bluetooth receiver, a global positioning system (GPS) receiver, and a radio frequency identification (RFID) transceiver, and wherein identifying said player further comprises means for at least one of:
    detecting a signal from a RFID tag in proximity to said playing surface during said sporting event, wherein said RFID tag is attached to equipment used by said player;
    detecting a location of a GPS transmitter in proximity to said playing surface during said sporting event, wherein said GPS transmitter is attached to equipment used by said player;
    detecting a signal from a radio frequency (RF) device in proximity to said playing surface during said sporting event, wherein said RF device is attached to equipment used by said player, and wherein said RF device comprises a Bluetooth transmitter; and detecting a shape of said player in a live video image of said sporting event.

10. The system as recited in claim 8, wherein said adding of said graphical aura further comprises means for at least one of:
   changing a visual appearance of said aura in response to said player committing a penalty;
   changing said visual appearance of said aura in response to one or more opposing players no longer being eligible to interact with said player; and
   changing said visual appearance of said aura in response to one or more real-time statistical performance levels of said player exceeding one or more pre-defined performance levels.

11. The system as recited in claim 8, wherein said adding of said graphical aura further comprises means for animating said graphical aura in response to a speed of wind detected in proximity to said playing surface.

12. The system as recited in claim 8 further comprising:
   a decibel meter that provides means for animating said aura in response to a level of noise detected in proximity to said playing surface.

13. The system as recited in claim 8 further comprising means for:
   identifying an object included in said sporting event; and
   adding a graphical object trail to said real-time graphical image displayed on said playing surface during said sporting event, wherein said graphical object trail comprises a graphical indication of at least one previous location of said object and a current location of said object.

14. A computer program product comprising:
   a non-transitory computer storage medium; and
   program code on said non-transitory computer storage medium that that when executed provides the functions of:
      identifying a player in proximity to a playing surface during a sporting event, wherein said playing surface includes a plurality of optical fibers configured to display one or more images;
      calculating a direction of movement of said player;
      adding a graphical aura in proximity to said player to a real-time graphical image displayed on said playing surface during said sporting event, wherein said aura comprises a generally circular colored graphical image;
      adding a graphical player trail to said real-time graphical image displayed on said playing surface during said sporting event in response to said player moving with respect to said playing surface, wherein said graphical player trail comprises a graphical indication of at least one previous location of said player and a current location of said player; and
      modifying said aura to include one or more pre-defined custom attributes in response to a determination that said player corresponds to said one or more pre-defined custom attributes.

15. The computer program product as recited in claim 14 further comprising code for:
   detecting a signal from a radio frequency identification (RFID) tag in proximity to said playing surface during said sporting event, wherein said RFID tag is attached to equipment used by said player;
   detecting a location of a global positioning system (GPS) transmitter in proximity to said playing surface during said sporting event, wherein said GPS transmitter is attached to equipment used by said player;
   detecting a signal from a radio frequency (RF) device in proximity to said playing surface during said sporting event, wherein said RF device is attached to equipment used by said player, and wherein said RF device comprises a Bluetooth transmitter; and
   detecting a shape of said player in a live video image of said sporting event.

16. The computer program product as recited in claim 14, wherein said code for adding said graphical aura further comprises code for:
   changing a visual appearance of said aura in response to said player committing a penalty;
   changing said visual appearance of said aura in response to one or more opposing players no longer being eligible to interact with said player; and
   changing said visual appearance of said aura in response to one or more real-time statistical performance levels of said player exceeding one or more pre-defined performance levels.

* * * * *